Patent [19] [11] 3,837,832
Pecoraro et al. [45] Sept. 24, 1974

[54] APPARATUS FOR MAKING FLOAT GLASS
[75] Inventors: George A. Pecoraro, Lower Burrell; John F. McConnell; Leonard A. Knavish, both of Pittsburgh, all of Pa.
[73] Assignee: PPG Industries, Inc., Pittsburgh, Pa.
[22] Filed: Feb. 27, 1973
[21] Appl. No.: 336,285

Related U.S. Application Data
[62] Division of Ser. No. 138,699, April 29, 1971, Pat. No. 3,734,701.

[52] U.S. Cl.............. 65/182 R, 65/27, 65/136, 65/337, 65/347
[51] Int. Cl. ............... C03b 18/02, C03b 5/22
[58] Field of Search............ 65/27, 347, 135–137, 65/99 A, 182 R, 337, 356

[56] References Cited
UNITED STATES PATENTS
3,240,581 3/1966 O'Connell et al. .............. 65/27
3,495,966 2/1970 West ......................... 65/137 X
3,523,781 8/1970 Levecque .................... 65/356 X
3,592,622 7/1971 Shepard ..................... 65/337 X Primary Examiner—Robert L. Lindsay, Jr.
Attorney, Agent, or Firm—E. Kears Pollock

[57] ABSTRACT

In the production of high-quality flat glass by the float process, tridymite-frost stone defects are safely avoided by providing burners in the refiner zone of the furnace to shield the crown of that portion of the furnace from contact with alkali vapors, and at the same time providing not only a barrier that substantially separates the refiner-zone headspace from the melter headspace but also preferably a means associated with refiner-zone headspace for exhausting or venting it.

7 Claims, 1 Drawing Figure

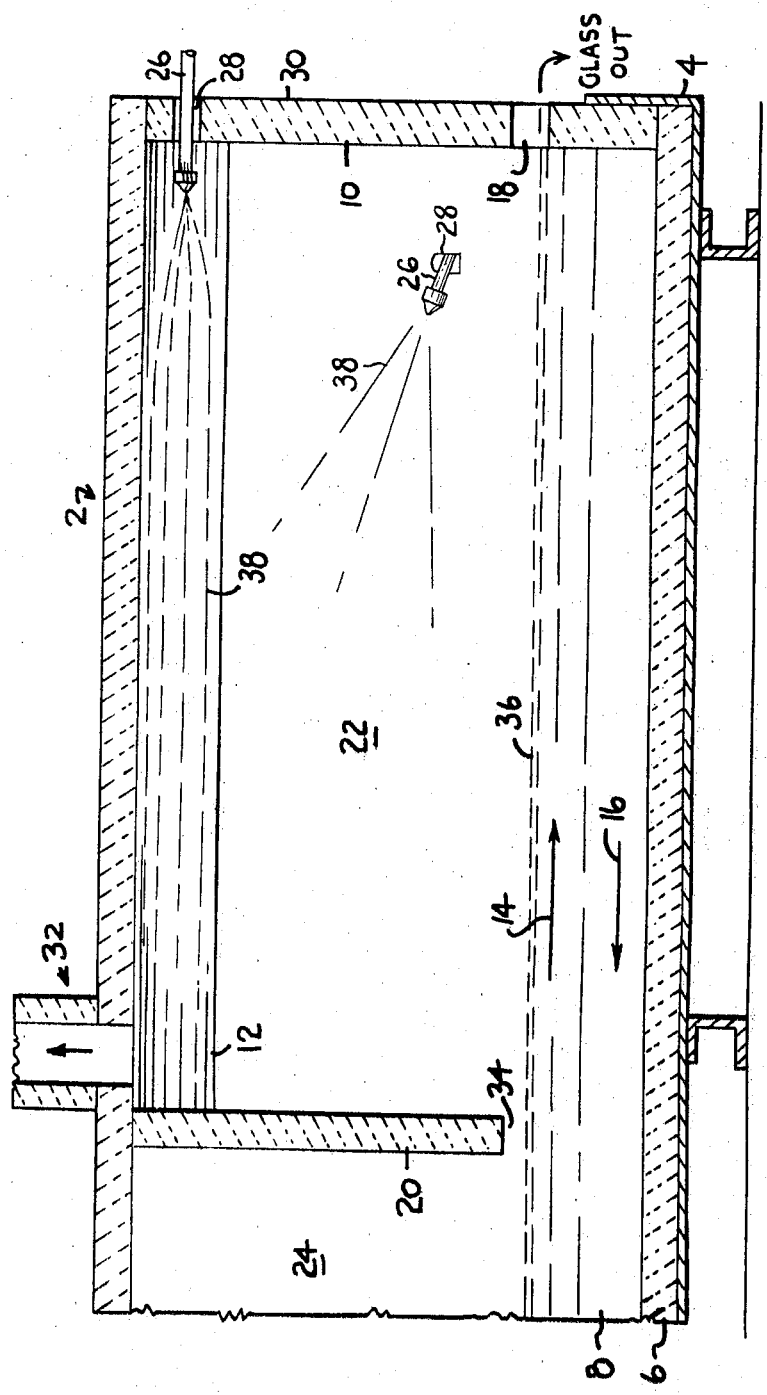

APPARATUS FOR MAKING FLOAT GLASS

This is a division of application Ser. No. 138,699, filed Apr. 29, 1971, now U.S. Pat. No. 3,734,701.

BACKGROUND OF THE INVENTION

1. Field of the Invention

This invention relates to production of high-quality flat glass by the float process, and in particular, to the avoidance of tridymite-frost stone defects in the product of such process.

2. Description of Prior Art

The production of high-quality flat glass by the float process, such as that of U.S. Pat. No. 3,083,551, is practiced on a large scale. In that art, it is known that in order to obtain a commercially acceptable product, care must be exercised to eliminate, to the greatest extent possible, the common kinds of defects that occur in such glass, such as seeds, blisters, ream knot and stones. Moreover, the measures taken toward the elimination of or the avoidance of such defects must be such that they produce no substantial deleterious effect upon the distortion quality of the product glass. For an operation to be commercially successful, it is generally necessary to produce glass exhibiting a defect density (considering defects of all known kinds) on the order of 4.0 per 100 per square feet of glass, and preferably about 2.0 or lower.

In the production of flat glass, it is known that one sort of defect occasionally encountered is the tridymite-frost stone defect. It is known that this kind of defect results from the action of alkaline vapors upon melting-furnace roof refractories, which commonly consist essentially of silica. The problem is of relatively little importance in the production of plate glass, because the defects are usually removed by the subsequent grinding and polishing operations. In a float-glass process, however, such grinding and polishing (which are costly steps) are avoided, and it becomes necessary to use other measures to avoid difficulty with tridymite-frost stone defects.

It is known, moreover, that there is usually no problem with such stones during the first 8 to 12 months of use of a new or a newly-lined furnace. Sometimes, the problem does not, even later, develop. If it does, various means are suggested in the prior art for dealing with it, but it is submitted that all of these have drawbacks in comparison with the instant invention.

In an article entitled, "The Siliceous Scale Dropped From The Tank Furnace Crown" by N. Araki, it is suggested that the problem can be overcome by using a silica brick of especially low lime content. The drawback of this approach is the greater cost of such refractories.

In references such as British Pat. No. 1,067,006; British Pat. No. 1,035,415; U.S. Pat. No. 3,240,581; and U.S. Pat. No. 3,238,030, it is suggested that the problem may be overcome by supplying to the furnace a sodium-sulphur compound and a chemically reducing atmosphere. This has a drawback of requiring close control of process conditions.

In Canadian Pat. No. 851,103, it is suggested that the problem be overcome by reconstructing the furnace roof so that a constant bleeding of gases through the pores of the silica refractory may serve to protect the refractory from attack by alkali vapors. Adoption of this expedient necessitates a furnace shut-down for cold repair. It appears questionable, moreover, that the amount of gas permeating the refractories is sufficient to have the desired effect unless special silica refractories, more porous than those normally used, are employed, and at that, it is questionable whether there may be obtained a porous silica-refractory material that has both the required porosity and sufficient strength to enable it to be used in a furnace-roof structure of substantial span.

In a patent application filed concurrently herewith in the name of George A. Pecoraro, one of the inventors herein, there is disclosed in practice of mechanically dislodging tridymite particles from the roof of the refiner of the melting furnace. This solution to the problem, while it has the advantage that it makes unnecessary any day-to-day operating expense, suffers the drawback that it involves either a loss of production (as, for example, when it is practiced during a time that the product otherwise would be satisfactory) or the drawback that it is sometimes necessary to tolerate a higher defect density in tridymite-frost stones than is desirable for a considerable period of time, i.e., until there is a thickness change or dilution change or cold repair.

It is to be admitted that there are known, in processes for melting and refining of glass, furnaces in which burners are provided in the forehearth or refiner section and/or a barrier is provided between the headspace of the refiner zone and that of the melter, so that the headspaces of the two zones comprise substantially different atmospheres. In this regard, reference may be made to U.S. Pat. Nos. 1,993,964; 2,600,490; and 2,767,235. The disclosures of the above patents lack, however, any appreciation of the importance of these features in connection with the problem of avoiding tridymite-frost stone defects in the production of high-quality flat glass by the float process, and they lack any teaching of the combination of such features with an exhaust means or vent communicating with the refiner-zone headspace, as taught herein.

SUMMARY OF THE INVENTION

In the production of high-quality flat glass by the float process, difficulty with tridymite-frost stone defects is safely avoided by providing burners in the front end of the furnace (in the refiner zone) so that the silica crown of that portion of the furnace is substantially kept from contact with alkali vapors, and at the same time providing a barrier that separates the refiner-zone headspace from the melter headspace and preferably a means associated with the refiner-zone headspace for exhausting or venting it. By means of the above-mentioned combination of features, the development of tridymite-frost stone defect densities higher than are tolerable is indefinitely postponed, so that interruption of the process on account of defects of that kind almost never becomes necessary. The benefits in terms of production saved far outweigh the cost of the inventive measures adopted. The proposed inventive combination not only safeguards against the development of the defects but also is such as to be adopted with a minimum of disturbance in the flow in the molten glass; moreover, it is also beneficial from the standpoint of tending to preclude the development in the glass in the refiner zone of the melting furnace of Rayleigh instabilities that tend to generate unwanted inhomogeneities ("ream") in the product high-quality float glass.

DESCRIPTION OF THE DRAWING

A complete understanding of the invention may be obtained from the foregoing and following description thereof taken together with the appended drawing, the sole FIGURE of which comprises a schematic elevation view of a portion of a glass-melting furnace that has been provided with the features in accordance with the instant invention.

DESCRIPTION OF THE PREFERRED EMBODIMENT

Referring to the FIGURE, there is shown a schematic indication of the downstream or refiner-end portion 2 of a melting furnace having a shell 4, and in its lower portion, a lining 6 of refractory material in contact with a bath 8 of molten glass. The upper portion of the refiner portion 2 also has a refractory lining 10 that includes an arched roof portion 12. Those skilled in the art will appreciate that, in accordance with the prior art, the refiner portion 2 comprises a part of a large regenerative-type furnace for the melting of glass-batch materials, with the furnace being generally rectangular in plan cross section and the depicted refiner portion 2 comprising the portion, about 40 to 50 per cent of the total length of the furnace, that is most distant from the end thereof at which the glass-batch materials are fed thereinto. To give an approximate idea of the scale of the operation, it is proper to say that the glass bath 8 has a width on the order of 25 to 40 feet; that the overall length of the melting furnace, including the refiner zone 2, is on the order of 150 to 400 feet; and that the amount of glass-batch material melted therein per day is on the order of 150 to 700 tons. In the furnace, the glass has a flow of the kind indicated by the arrows 14 and 16, i.e., in the upper portions of the glass bath 8 which contains the hotter glass, there is a forward flow as indicated by the arrow 14, and in the cooler and lower portion of the bath 8, there is a return flow as indicated by the arrow 16. As needed or desired, glass leaves the refiner portion 2 of the melting furnace through the opening 18, passing then by conventional means, which are not shown but may include a flow-regulating tweel and a lip, onto a bath of molten tin and then therealong, under conditions of temperature, pressure, and applied force that adjust suitably its viscosity and its thickness, to the exit end of the molten-tin bath, at which the product flat glass is removed in the form of a sheet about 1/16 to 1 inch thick and 70 to 200 inches wide, for further processing.

All the features of apparatus described heretofore may be taken as conventional.

In accordance with the instant invention, a melting furnace having a refiner zone 2 as indicated above is provided with the additional features of a barrier 20 that separates the refiner-zone headspace 22 from the melter-zone headspace 24; one or more burners 26 that project through an opening or openings 28 in one or more of the walls 30 of the zone 2 of the melting furnace; and preferably but not necessarily also a vent or exhaust means, generally indicated at 32. These features will be discussed in greater detail hereinbelow.

The barrier 20 may take form of a drop arch or a shadow wall made of silica or other suitable refractory material. Preferably, it is substantially imperforate and has a lower end 34 that is ideally positioned at a distance of about 2 to 12 inches from the surface 36 of the glass bath 8. If the spacing is much larger than that, the desired effect of segregating the refiner-zone headspace 22 from the melter-zone headspace 24 can be obtained only with the addition of large volumes of temperature-controlled hot air, which is usually economically disadvantageous. With a smaller spacing, closer control of the level of the surface 36 becomes more important. Moreover, there is in some instances inadequate room for the insertion of desired auxiliary equipment such as a blown-gas homogenizer such as that of British Pat. No. 1,171,133. In principle, there is no reason why the spacing between the end 34 of the barrier 20 and the surface 36 of the glass may not be less than 2 inches, being possibly as little as ½ inch.

It is frequently desirable for the barrier 20 to be positioned so that it is located within a waist or channel that joins the melting zone and the refining zone of the melting furnace. This makes possible a saving in the amount of material and time that is required for the construction of the barrier 20, but it is not considered essential to the operation of the present invention. Such a waist or channel may have a width of approximately 10 to 60 per cent of the overall width of a melting furnace.

Another feature comprising the combination of the instant invention consists in the use of one or more burners 26, introduced through an opening or openings 28 preferably in the front wall 30 of the refiner zone 2. An alternate location for the burners, but not one as desirable, is in the refiner breast wall, close to the front wall, with particular attention being given to the angle of burner insertion along with the velocity of gases leaving the burner. As indicated in the drawing, these produce a non-luminous flame or flames 38. Actually, the non-luminous flame 38 may also be regarded merely as a jet of hot gases resulting from the combustion of, for example, natural gas and a sufficient proportion of excess air. It is quite important that luminosity be avoided because a luminous flame creates in the molten glass a pattern of heating by radiation that engenders unwanted convective flows in the glass. Such convective flows may tend to deprive the glass of the relatively high degree of internal homogeneity that it should possess if it is to be or remain useful for the making of high-quality flat glass.

The gases emanating from the burner or burners 26 serve to prevent alkaline vapors from coming into contact with the arch portion or crown 12 of the refiner zone 2. In this way, they serve to prevent the development on that refractory surface of particles of tridymite that might otherwise build up, over a period of months, and then begin to fall into the glass bath 8, appearing in the product as tridymite-frost stone defects. It appears that for the most part, if there is any similar reaction between alkaline vapors and the roof of the melter portion of the melting furnace, either the reaction is less rapid or the particles of tridymite that fall from the roof have an adequate opportunity to become dissolved in the glass, or both.

The refiner zone 2 stands nearer to the forming operation, and the glass in it is cooler, being at about 1800° to 2400° Fahrenheit. In accordance with the invention, it is considered essential that the gases be supplied through the burner or burners 26 at a rate sufficiently great to protect the crown 12 adequately. For a refiner zone 30 feet wide and approximately 75 feet long, in the process of making float glass at a rate of about 350 tons per day, it must be considered necessary that the air-gas volume be supplied at a rate of about 60,000 standard cubic feet per hour, though this may vary from 30,000 to 80,000 standard cubic feet per hour, depending on conditions. Less will not reliably yield the desired results, and more is not only uneconomical from the standpoint of added fuel consumption but also likely to have unwanted thermal effects upon the molten glass. Although for an installation operating on the scale indicated above, satisfactory results may be obtained with a single burner located near the top of the crown 12 and having its output directed substantially horizontally, it is preferred that there be used a plurality of suitable burners, such as two to six of them, and possibly more. These are arranged at suitably spaced intervals, with their output being directed substantially horizontally and with them ideally but not necessarily being located closer to the crown 12 than to the glass surface 36. Satisfactory results may be obtained, however, with two burner pipes, each projecting through a breast wall of the refiner zone and feeding gases having a composition and flow rate as indicated elsewhere herein.

It is considered essential that the gases so introduced be hot, i.e., within about 300° Fahrenheit of the temperature of the glass in the bath 8, and preferably more closely matched than that to the temperature of the glass, i.e., within about 50° Fahrenheit. Where possible, it is desirable that the gases be somewhat hotter than the glass, since this reduces the tendency for the glass in the bath to develop Rayleigh instabilities that result in a product defect known as "ream."

With respect to the composition of the materials introduced through the member or members 26, it may be stated that adequate results may be obtained with any hot gas that is substantially unreactive with the refractories comprising the crown 12. Thus, if a satisfactory supply of hot air, nitrogen, or inert gas is available, such gas may be used. In most instances, however, it is least costly to produce the required gas by the combustion of a liquid or gaseous hydrocarbon fuel with a suitable quantity of excess air, such as 50 to 500 per cent more than the stoichiometric amount required for combustion. The possibility of using air that has been enriched with an addition of oxygen, to aid in obtaining desired high flame temperatures is also not to be overlooked. It may be desirable in some instances to preheat the air or oxygen-enriched air used to produce gases desired.

An example of a suitable composition of gas comprising the flame or jet 38 is the mixture resulting from the combustion of natural gas (substantially methane) with 50 per cent of excess air, i.e., about 1 mole of gas to 15 moles of air.

If flat glass of high quality is to be made, it is important to take into account the temperature and flow rate of the gas supplied, making sure that the refiner zone 2 is not heated or cooled by too much. In this regard, satisfactory results were obtained when operating on the scale indicated above (refiner zone 30 feet by 75 feet, 350 tons per day) and with the orifice 34 having an area of 16 square feet, by using a pair of burners that have outlets located in the breast walls of the refiner zone on opposite sides of the refiner zone. The outlets were substantially flush with the breast wall, 2 feet above the metal line and about the same distance from the front wall. The jets coming from such outlets were angled about 10° from the horizontal upwardly and about 10° uptank. Each outlet provided combustion gases from 2000 standard cubic feet per hour of natural gas and 30,000 standard cubic feet per hour of air. The jets were issued from pipes 16 inches in diameter, but of course, pipes much smaller could have been used. The satisfactory results thus obtained included long-term avoidance of the development of tridymite-stone defects in the product high-quality float glass, together with the avoidance of the development of unwanted disturbances in the flows of the molten glass contained within the refiner zone, as evidenced by no detectable increase in "ream" in the product glass attributable to the front-end firing operation.

The invention also comprises in a preferred aspect the use of an exhaust or vent means 32 that communicates with the headspace 22 of the refiner zone 2 and serves to remove gases therefrom. This may take the form of a smokestack having its interior, at least in the bottom portion thereof, lined with refractory and being 20 or more feet high with suitable diameter when the invention is operated on the general scale indicated above. Such an exhaust or vent means may also comprise a damper means (not shown) for controlling or requlating (retarding) the rate of passage of gases therethrough, and/or a fan means (not shown) for accelerating the passage of gases therethrough. It is considered important that the exhaust or vent means, if used, be located substantially adjacent to the barrier 20. The vent may be permitted to discharge from the refiner directly into the melter under suitable pressure conditions.

The concept of providing a float line with the combination of features indicated above is particularly valuable in that it makes it possible to avoid the development of a situation in which, for example, the defect density in tridymite stones has risen to an undesirable level, such as 0.5 or 0.7 per 100 square feet of glass, yet no cold repair or thickness change or dilution change is scheduled for the near future. Prior to the instant invention, it was considered necessary either to sacrifice production or to tolerate such a defect level, whereas the instant invention serves to prevent the situation from arising. In another aspect, the combination of a barrier and the exhaust or vent means makes it possible to introduce in the refiner zone substantial quantities of crown-protecting hot gases, yet at the same time to avoid the upset in the operation of the remainder of the melting furnace that might be encountered if these features are not employed. The refiner zone 2 operates at a substantially lower temperature than the melter zone of the melting furnace, and if measures are not taken to permit the venting or exhaust of the substantial quantities of the crown-protecting hot gases, it is to be expected that these gases, although hot, would pass upstream in the melting furnace and then proceed to dilute the still-hotter gases entering the checker chambers of the regenerative firing system of the melter zone. Such dilution degrades the performance of such checker chambers; they are less hot after the diluted gases pass through them, and they accordingly are less able, when the regenerative firing system is reversed, to provide the desired preheat to the air that then passes through them.

Still another feature is that when the gases fed through the burner or burners 26 are hotter than the glass, there is a tendency to decrease the depth below the glass surface 36 at which the customary temperature inversion occurs, and as those who are familiar with the problems of melting high-quality flat glass and with advanced theories of fluid mechanics will readily appreciate, the depth of the location of said temperature inversion has a profound effect upon the Rayleigh Number of the fluid-flow system in the refiner zone 2. When the Rayleigh Number of that fluid-flow system is more than about 1100, the hotter and less dense molten glass that is in the vicinity of the temperature-inversion level has a strong tendency to break loose, welling upward through the more dense and somewhat cooler glass above it, and this tends to cause a serious degeneration in the quality of the product flat glass. The Rayleigh Number is directly proportional to the cube of the temperature-inversion depth. We have discovered that the cost of supplying gas to the burner or burners 26 is surprisingly small, in comparison with the cost of losing one or two days of production per year as the result of defects in the nature of tridymite-frost stones or "ream" of the Rayleigh instability type.

We claim as our invention:

1. In the apparatus for making flat glass comprising a glass melting and refining furnace having a melting zone for receiving raw batch materials and for melting said raw batch materials to form molten glass and a refining zone for gradually cooling and conditioning said molten glass to prepare it for forming; a means for delivering conditioned molten glass from said refining zone to a forming chamber; and a forming chamber comprising means for forming a continuous sheet of glass from delivered molten glass by floating it upon molten metal, cooling it and applying forces to it and means for withdrawing said continuous sheet of glass from said forming chamber, wherein said furnace has a silica-containing crown facing said molten glass and separated therefrom by a headspace; the improvement comprising a. means for directing at least one stream of hot non-luminous gas into said headspace in said refining zone, said gas stream directing means having sufficient capacity to direct sufficient gas into said headspace in said refining zone to substantially prevent the flow of gases from said headspace in said melting zone into said headspace in said refining zone; and b. means for heating a gas to provide said stream of non-luminous gas at a temperature greater than that for molten glass in said refining zone.

2. The apparatus according to claim 1 wherein said furnace has a wall member extending into said headspace between said melting zone and said refining zone.

3. The apparatus according to claim 1 further comprising an exhaust means connected to said furnace and communicating with said headspace in the immediate vicinity where said melting zone meets said refining zone.

4. The apparatus according to claim 3 wherein said furnace has a waist separating said melting zone and said refining zone and said exhaust means is connected to said furnace at said waist.

5. The apparatus according to claim 3 wherein said furnace has a wall member extending into said headspace between said melting zone and said refining zone, and said exhaust means is connected to said furnace in communication with said headspace in said refining zone.

6. The apparatus according to claim 1 wherein said furnace is provided with a pair of gas stream directing means and gas heating means, one combination on such side of said furnace; and wherein each said gas stream directing means and gas heating means comprises a burner for burning a fuel in the presence of an excess of oxygen and a nozzle extending into said headspace in said refining zone.

7. The apparatus according to claim 6 wherein said nozzles are extended into said headspace in said refining zone on opposite sides of said refining zone and said nozzles are positioned such that flow from each may be directed across said refining zone toward the other and such that flow from each may be directed upwardly with respect to the horizontal.

* * * * *